United States Patent
McAfee et al.

(10) Patent No.: US 8,167,221 B2
(45) Date of Patent: May 1, 2012

(54) SPRINKLER HOUSING HAVING A SIDE INLET TO REDUCE STRESS CONCENTRATIONS THEREAT

(75) Inventors: Michael A. McAfee, Tucson, AZ (US); Noel Perez, Baja California (MX)

(73) Assignee: Rain Bird Corporation, Azusa, CA (US)

( * ) Notice: Subject to any disclaimer, the term of this patent is extended or adjusted under 35 U.S.C. 154(b) by 202 days.

(21) Appl. No.: 12/470,273

(22) Filed: May 21, 2009

(65) Prior Publication Data
US 2010/0294854 A1    Nov. 25, 2010

(51) Int. Cl.
*B05B 1/00*    (2006.01)
(52) U.S. Cl. ........ 239/599; 239/204; 239/568; 239/600; 285/133.11; 285/133.5
(58) Field of Classification Search .................. 239/204, 239/550, 551, 565, 568, 599, 600; 285/133.11, 285/133.5, 189, 191
See application file for complete search history.

(56) References Cited

U.S. PATENT DOCUMENTS

| | | | |
|---|---|---|---|
| 2,005,385 A | | 6/1935 | O'Hara |
| 3,342,193 A | * | 9/1967 | Ballard et al. ..................... 137/3 |
| 3,776,253 A | | 12/1973 | Yamaguchi et al. |
| 4,078,726 A | | 3/1978 | Walto |
| 4,317,023 A | | 2/1982 | Gryskiewicz |
| 4,343,358 A | | 8/1982 | Gryskiewicz |
| 4,406,326 A | | 9/1983 | Wagner |
| 4,448,353 A | | 5/1984 | Livne |
| 5,551,733 A | | 9/1996 | Henwood |
| 6,193,168 B1 | | 2/2001 | Bedford |
| 6,488,218 B1 | | 12/2002 | Townsend et al. |
| 6,530,531 B2 | | 3/2003 | Butler |
| 7,360,718 B2 | | 4/2008 | Yeh et al. |
| 2002/0092924 A1 | * | 7/2002 | Ingham et al. ................ 239/205 |
| 2006/0108444 A1 | * | 5/2006 | Yeh et al. ..................... 239/204 |

OTHER PUBLICATIONS

K.Mandal et al. The study of a racetrack-shaped defect in ferromagnetic steel by magnetic barkhausen noise and flux leakage measurements, 2000, Elsevier Science, Journal of Magnetism and Magnetic Materials vol. 212, pp. 231-239.*
Rain Bird Tech Specs, 1800 Series Spray Heads, 2002, 4 pp.
Rain Bird Corporation, Part/Full Circle Rotor, Catalog No. 414, Illustrates a commercially available sprinkler body prior to Nov. 12, 2003, 1p.
Rain Bird Corporation, Part/Full Circle Rotor, Catalog No. 416, Illustrates a commercially available sprinkler body prior to Nov. 12, 2003, 1 p.

* cited by examiner

*Primary Examiner* — Dinh Nguyen
*Assistant Examiner* — Viet Le
(74) *Attorney, Agent, or Firm* — Fitch, Even, Tabin & Flannery, LLP

(57) ABSTRACT

A sprinkler housing having a side inlet with improved strength and durability is disclosed. The housing includes an inlet opening having a shape configured to position regions of peak stress concentration on the housing side walls, upon the sprinkler housing being filled with a pressurized fluid, circumferentially spaced from the upper and lower central points of the inlet opening to provide a more robust sprinkler housing.

16 Claims, 9 Drawing Sheets

SPRINKLER HOUSING HAVING A SIDE INLET TO REDUCE STRESS CONCENTRATIONS THEREAT

FIELD

The field relates to irrigation sprinklers and, more particularly, to irrigation sprinklers having a side inlet with improved durability.

BACKGROUND

Irrigation systems utilize a series of pipes or conduits for conveying water from a water source to a series or network of water emitters or sprinklers. Though at one time metallic pipes were used, these suffered from exterior rust and corrosion, as well as interior fouling, and carried a high materials expense. Coatings were developed which promoted the life of metallic pipes, and the use of large diameter pipes helped alleviate the problems with interior fouling. However, cost remained an issue until polymeric piping was developed. Polymer or plastic piping offered additional benefits. For instance, threading and sealing of plastic joints is simpler and more reliable. One drawback to plastic piping has traditionally been its strength, particularly in localized regions containing stress concentrators or non-uniform mechanical properties.

A common irrigation system component manufactured from plastic materials is a pop-up irrigation sprinkler. This type of sprinkler is typically buried in the ground and includes a stationary housing and a riser assembly mounted within the housing which cycles up and down during an irrigation cycle. During irrigation, pressurized water typically causes the riser assembly to elevate through an open upper end of the housing and rise above the ground level to distribute water to surrounding terrain. The pressurized water causes the riser assembly to travel upwards against the bias of a spring to the elevated spraying position to distribute water to surrounding terrain through one or more spray nozzles. When the irrigation cycle is completed, the pressurized water supply is shut off and the riser is spring-retracted back into the stationary housing.

Pop-up irrigation sprinklers generally include either a spray or rotary nozzle on the riser assembly. Spray riser assemblies commonly have one or more spray nozzles that are fixed relative to the riser assembly and distribute water over a set area. By contrast, a rotary riser assembly commonly includes a rotatable nozzle turret mounted at the upper end of the riser assembly. The turret includes one or more spray nozzles and is rotated through an adjustable water distribution pattern. Rotary sprinklers often include a water-driven motor to transfer energy of the incoming water into a source of power to rotate the turret. During normal operation, the turret rotates to distribute water outwardly over surrounding terrain in an arcuate pattern. In either case, the housing configured to receive the riser assembly generally has either a side or lower inlet for connecting to the input supply water.

Plastic sprinkler housings are typically injected molded, but injection molding techniques can lead, in some cases, to non-uniform mechanical properties in the sprinkler housing, such as a weakened point or weakening feature referred to as a knit line. Specifically, thermoplastic polymers flow at a rate dependent on their temperature and the speed of injection. The polymeric materials are typically forced into a mold with a temperature lower than that of the plastic. Therefore, the plastic begins to cool on contact with the mold. This cooling is most pronounced at the leading edge of the injection flow, and the leading edge begins to solidify and develop a surface texture as it flows through the mold. When two leading edges meet, a line referred to as a knit or mold line may be formed. The plastic material localized at the knit line generally does not tend to form as strong a bond because the polymer may not join and flow as well at this interface. Therefore, the knit line may not bond as well and may be a weaker point in the housing. Though the sprinkler housings may be reinforced with fibers, such as fiberglass, these fibers often do not cross the knit line interface, so the knit line may not realize the benefits of the presence of the fibers. Therefore, the knit line may weaken the sprinkler housing.

Sprinkler housings with side inlets also tend to have a reduced life as compared to sprinkler housings with only a bottom inlet. During use, the maximum stress on the sprinkler housing is generally experienced when the water source is turned on and a pressure surge is transmitted to the sprinkler housing. That is, the pressure directed through the sprinkler housing is not free to simply pass through the housing because any standing water in the sprinkler housing must first be pressurized to overcome its static state. This generates stresses throughout the sprinkler housing. It has been found that sprinkler housings with a side inlet tend to underperform housings without a side inlet. More particularly, the side-inlet sprinkler housing typically has stress concentrations proximate the edges forming the side inlet and most often at the knit line about the side inlet. These stress concentrations can result in fatigue and cracks that originate in these high-stress areas. These cracks can grow resulting in either water leaks or fracture causing the sprinkler housing to be inoperable. Even a small leak can reduce sprinkler performance and waste large amounts of water.

DETAILED DESCRIPTION OF THE PREFERRED EMBODIMENTS

Sprinkler housings with a side inlet are provided that have a side inlet configuration that enables the housings to be more durable than prior side-inlet housings and, therefore, have a longer lifecycle. By one approach, the side inlet has an elongated shape that is more robust in withstanding the stresses of use than previous circular-shaped inlet openings. By one approach, the side inlet has a generally elliptical or oblong configuration with a minor and major axis where a length of the major axis is longer than a length of the minor axis. The minor axis of the inlet is oriented along a longitudinal axis of the housing, and the major axis is oriented substantially transverse to the longitudinal axis of the housing. In one aspect, such configuration of the side inlet is effective in minimizing stress concentrations thereabout that reduces peak stress within the sprinkler housing side walls during pressurization thereof.

By another approach, the sprinkler housing is an elongate, injection-molded structure having a side wall thereof with an inlet defined in the side wall. Because the housing is injection molded, it also may include a molding knit line that bisects the inlet and extends in a longitudinal direction along at least a portion of the length of the sprinkler housing. Thus, in another aspect, the inlet has a shape configured to position regions of increased stress concentration, upon the housing being pressurized with water, spaced away from the molding knit line. The shape of the inlet, therefore, is effective to reduce the stress concentrations in the wall adjacent the intersection of the molding knit line and the inlet and reposition the peak stress away from the molding knit line upon the sprinkler housing being filled with the pressurized fluid.

In yet another aspect, the sprinkler housing includes an annular collar joined to the sidewall and positioned to surround the inlet defined by the side wall. Extending about the side wall within the annular collar is a plate portion that has an inner edge defining the shape of the side inlet. By one approach, a distance between the inner edge of the plate portion defining the inlet and an inner surface of the annular collar varies in a non-uniform manner about the periphery of the inlet. In this regard, the plate and inlet reduce and reposition the stress concentrating features typically exhibited by traditional irrigation system components having circular or uniform spacing about a side inlet.

Figure 1:
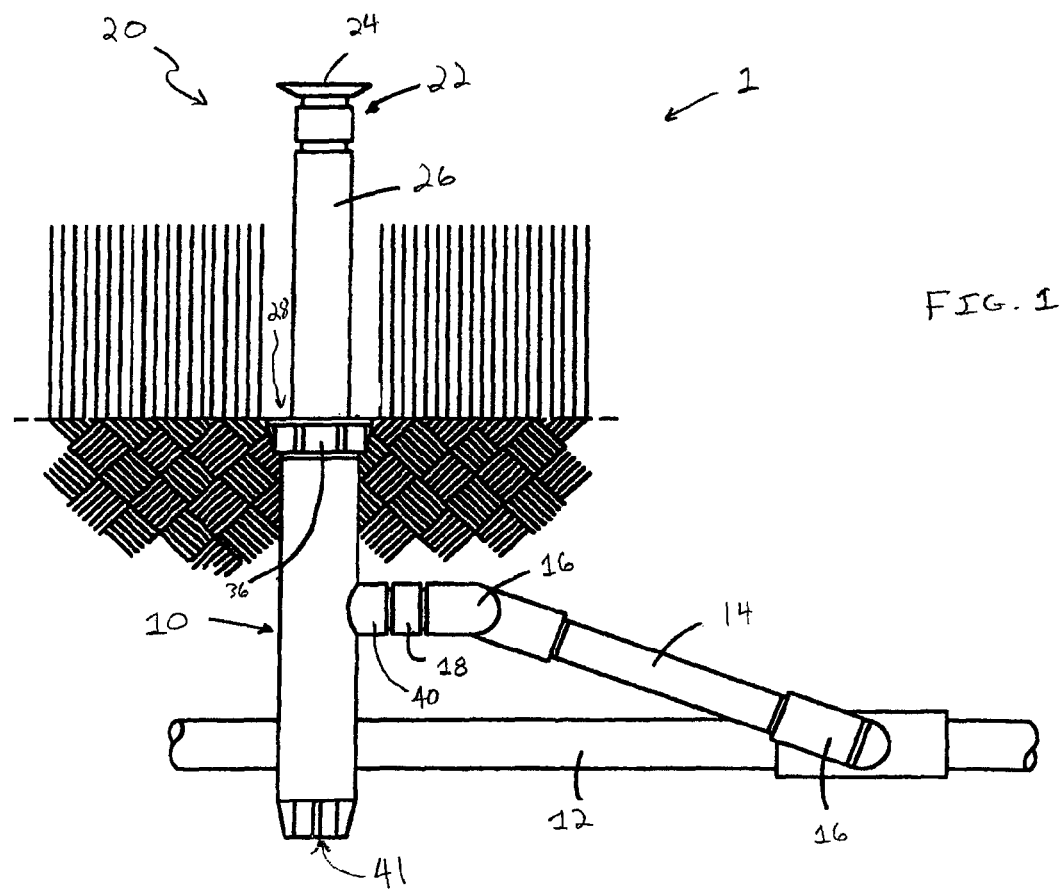
FIG. 1 is an environmental schematic of an exemplary irrigation system.
Figure 2:
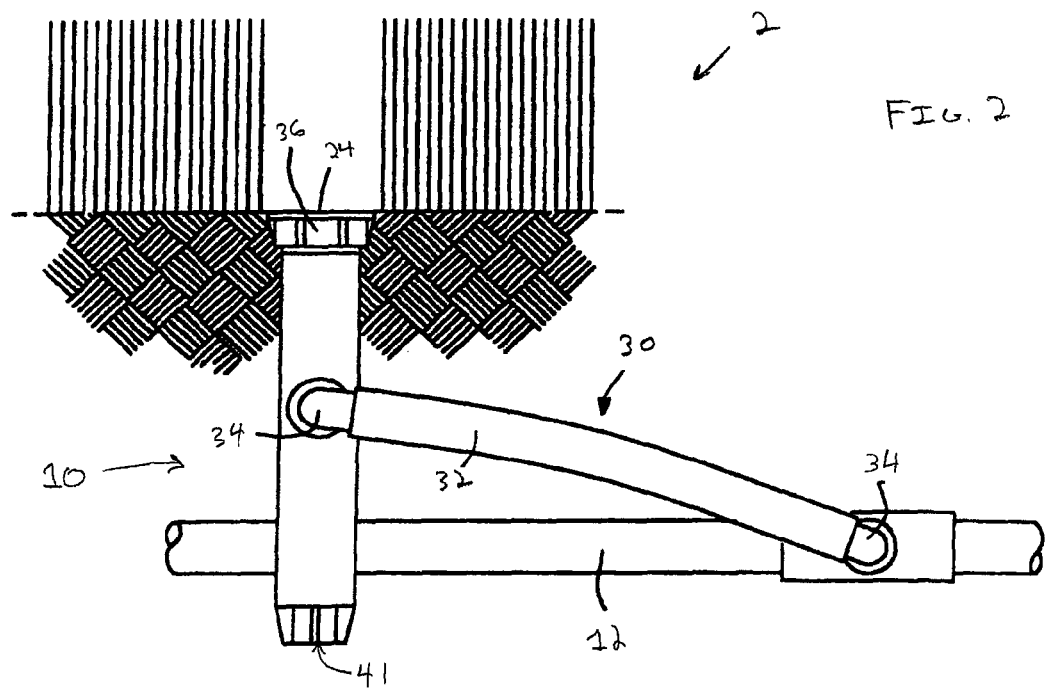
FIG. 2 is an environmental schematic of an exemplary irrigation system.

Turning to the Figures, FIGS. 1-2 illustrate irrigation systems 1 and 2, which may include a plurality of sprinkler housings 10 (only one is shown), connected to a lateral pipe 12 providing pressurized water to the sprinkler housing 10. The sprinkler housing 10, for instance, may be coupled to the lateral pipe 12 through a spoke pipe 14, which may include one or more swing joints 16 and one or more sections of coupling pipe 18, as shown in FIG. 1. Generally, the spoke pipe 14 and coupling pipe 18 are PVC piping or other suitable tubing and the swing joints 16 include appropriate combinations of PVC nipples, tees, or elbow joints suitable for mating the coupling pipe 18 to the spoke pipe 14. However, other tubing and connection methods are suitable so long as a water-tight seal is maintained. In this arrangement, irrigation system 1 provides water to the other sprinkler housings 10 (not shown) through the continued and uninterrupted flow of water in the lateral pipe 12.

FIG. 2 illustrates the sprinkler housing 10 within a second exemplary irrigation system 2 using an alternative coupling method and spoke pipe 30. In this alternative connection, a swing pipe or flexible pipe 32 is coupled to the sprinkler housing 10 using joints 34. In this connection method, the joints 34 are generally male NPT pipe couplers and barb elbow joints, though any suitable method that secures or couples the swing pipe 32 to the sprinkler housing 10 is suitable.

In use in either system, the sprinkler housing 10 is coupled with a pop-up riser 20 with a fixed or rotary spray head 22, and may have a surface flange 24 configured to be positioned flush with ground level. The sprinkler housing 10 can be used with a variety of spray or rotary heads, which the spray head 22 is but one example. When water is provided to the irrigation system 1 or 2, water flows through the spoke pipe 14, 30 into the sprinkler housing 10. At this point, the water pressure causes the riser 20 to extend a predetermined distance beyond a riser opening 28 in sprinkler housing 10, as shown in FIG. 1, to provide water to the surrounding area. When watering is complete and the irrigation water is shut off, the riser 20 retracts or slides back into sprinkler housing 10, as generally shown in FIG. 2, where the riser 20 is received into a cavity within the sprinkler housing 10 and the surface flange 24 of the spray head 22 is flush with a flange 36 on the upper end of the housing 10. The riser 20 may be biased toward the retracted position by a spring positioned within the sprinkler housing 10.

Figure 3:
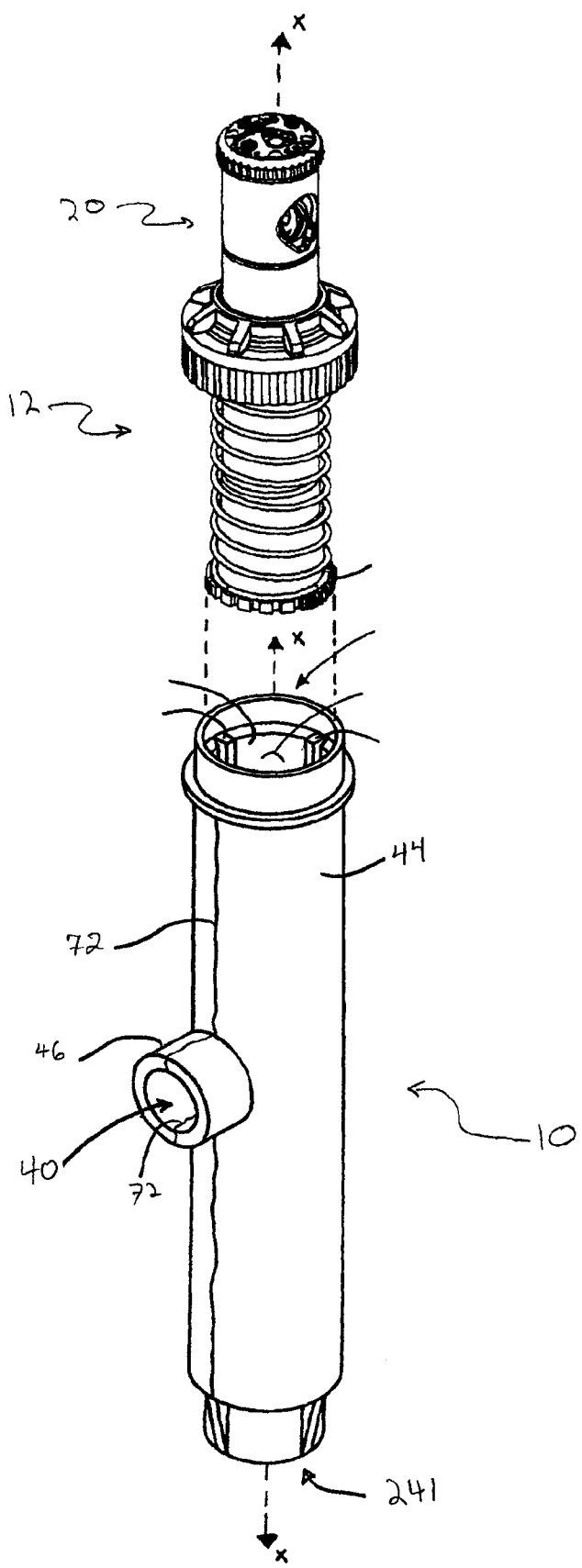
FIG. 3 is an exploded perspective view of a sprinkler housing with a side inlet.
Figure 4:
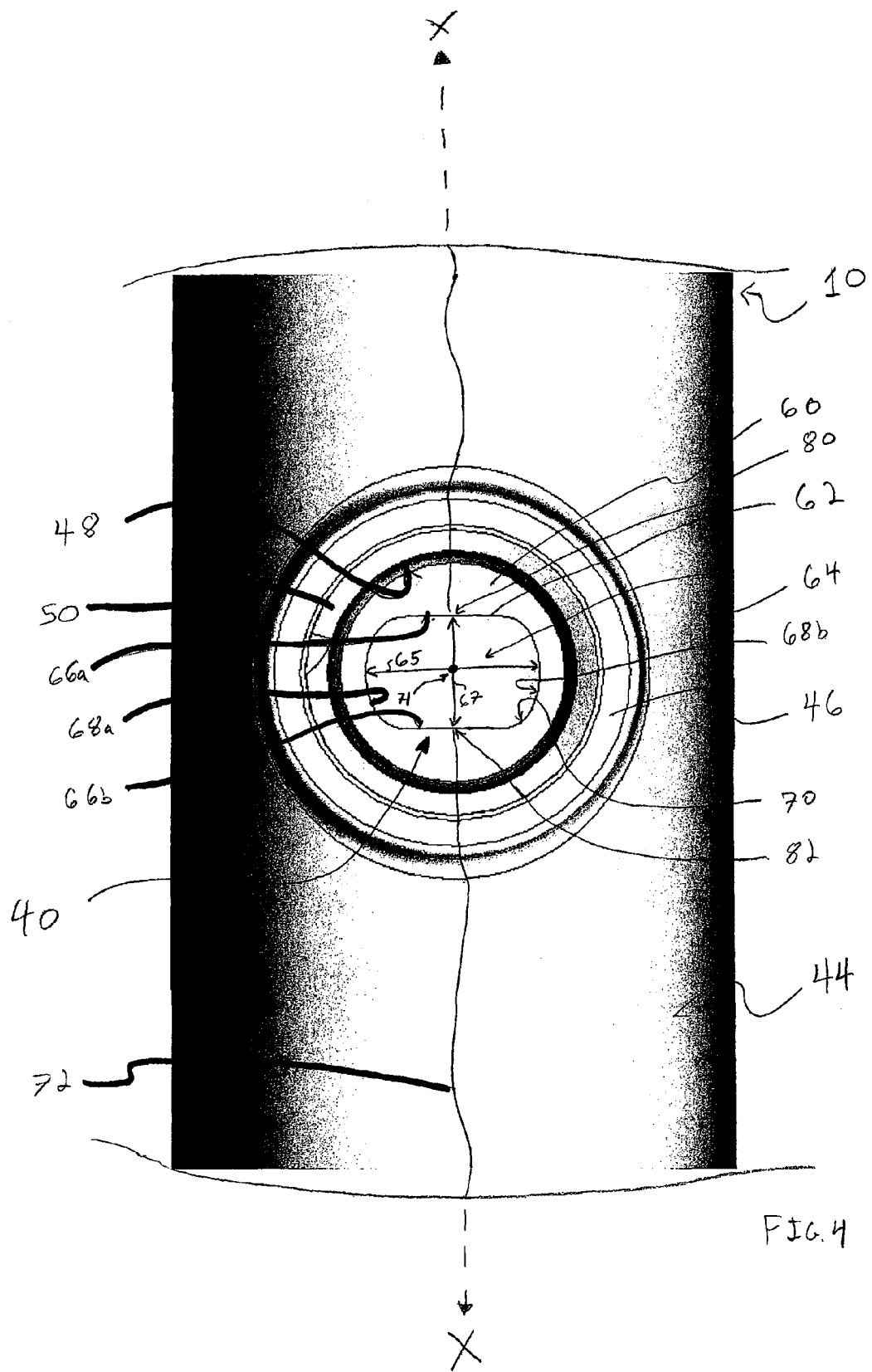
FIG. 4 is a portion of a side elevational view of sprinkler housing having a side inlet.

One embodiment of the housing 10 with the new side inlet shape is shown in FIGS. 3 and 4 where a cylindrical wall 44 of the housing 10 forms a generally tubular configuration and permits water received from the water source to enter the housing 10 and elevate the riser assembly. The housing 10 includes a side inlet 40 for joining the coupling pipe 18 or joint 34 to the housing 10. To facilitate connection to the pipe 18 or joint 34, an annular collar 46 extends outwardly from the side wall 44 and surrounds or extends about the side inlet 40. The collar 46 permits connection to the pipe 18, joint 34 or other connections of the water delivery system. In a preferred embodiment, the annular collar 46 includes an inner surface 48 having a thread 50 for engaging a corresponding threading on the coupling pipe 18 or the joint 34; however, other joining methods may also be employed.

As mentioned above, the side inlet 40 allows water from the water source to enter the housing 10. To this end, the annular collar 46 is generally transverse to a longitudinal axis X of the housing 10 and surrounds an inlet plate portion 60 of the side wall 44. The plate portion 60 defines the inlet 40. The plate portion 60 includes an inner edge 62 that defines an inlet opening 64 of the inlet 40. The inlet opening 64 has a non-uniform shape relative to a centrally located point 71, as further discussed below. By one approach, the inner edge 62 includes two straight edges 66a, 66b extending substantially parallel to each other and transverse to the longitudinal axis X and two opposing curved edges 68a, 68b joining opposite ends of the straight edges 66a, 66b. As such, the edge 62 defines the inlet opening 64 as having a generally elliptical shape, oblong shape, or obround shape. Preferably, the edge 62 defines a shape of the inlet opening 64 having two semicircles 68a, 68b connected by parallel lines 66a, 66b tangent to endpoints of the semicircles 68a and 68b. Further, the inlet plate edge 62 includes curved intersections or fillets 70 at the intersection of the parallel edges 66a, 66b and curved edges 68a, 68b to provide a smooth transition therebetween. The fillets 70 are effective to help minimize sharp angles which may cause stress concentrations.

Referring again to FIG. 4, the shape of the inlet opening 64 also is defined by a major axis 65 and a minor axis 67 intersecting the central point 71. The minor axis 67 is oriented substantially parallel to the housing longitudinal axis X, and the major axis 65 is oriented substantially perpendicular to the housing longitudinal axis X. Preferably, the major axis 65 has a length that is longer than the length of the minor axis 67. In other words, a distance on the major axis 65 from the central point 71 to the edge 62 is longer than a distance on the minor axis 67 from the central point 71 to the edge 62. In one approach, a ratio of the major axis 65 length (from edge to opposite edge about the axis 65) to the minor axis 67 length (from edge to opposite edge about the axis 67) is at least about 1.2 to about 1.7, and preferably about 1.5. This inlet opening ratio is effective to achieve the increased durability of the sprinkler housing construction without negatively effecting water flow rates into the housing 10. If the inlet opening 64 were formed such that the ratio was below this range and approaching about 1, the inlet opening would have a generally uniform or circular shape, which is undesirable because of the stresses it creates within the housing as typically found in prior art side-inlet housings, which will be discussed in detail below. Conversely, as the ratio increases beyond about 1.7, the inlet opening 64 becomes more undesirably elongated, which results in stress concentrations, manufacturing difficulties, and other flow and sealing problems. As discussed more below, the shape of the inlet opening of the housings herein are configured to reduce and position the regions of peak stress concentrations on the cylindrical side wall, upon the sprinkler housing being filled with a pressurized fluid, circumferentially spaced from an intersection of the minor axis 67 and the peripheral edge 62 of the inlet opening.

As also shown in FIG. 4, the inlet opening 64 is positioned generally centrally on the inlet plate portion 60 to concentrically align the inlet opening 64 within the annular collar 46. With this approach, the edge 62 defining the inlet opening 64 is non-uniformly spaced from the annular collar 46 about the periphery of the opening 64. By one approach, a distance on the plate portion 60 along the longitudinal axis X between the inner edge 62 of the plate portion 60 and the inner surface 48 of the annular collar 46 is longer than a distance on the plate portion 60 transverse to the longitudinal axis X between the edge 62 and the inner surface 48 of the annular collar 46 so that the inlet opening 64 has the generally non-uniform elliptical, oblong, or obround shape. In other words, the distance between the inner edge 62 and inner surface 48 on the plate portion 60 is greatest along the longitudinal axis X and is smallest transverse to the longitudinal axis X.

Altering the size or shape of the inlet opening also negatively affects this spacing on the inlet plate portion 60 between the collar wall 46 and opening edge 62, which can affect flow rates and the ability to seal the inlet against leakage. That is, increasing the length of either axis 65 or 67 affects the radial distance between the edges 62 and the inner surface 48 of the tubular wall 46. Decreasing one axis degrades flow into the housing, and increasing the axis reduces the contact area on the inlet plate portion 60 for sealing with the coupling pipe 18 or joint 34. Insufficient area on the plate portion 60 may result in poor sealing at the inlet. For example and in one embodiment, an end of the coupling pipe 18 is threaded into the collar 46 until the end of the coupling pipe 18 abuts the inlet plate portion 60. The inlet plate portion 60 may be substantially planar or flat (relative to the curved side wall 44) so that the end of the coupling pipe 18 is firmly seated against a portion of the periphery of the inlet plate 60 to permit a watertight connection between the coupling pipe 18 and the housing 10. A sealing member may also be used. To provide a watertight connection, the inlet opening 64 is sized such that the opening 64 does not extend beyond the opening of the coupling pipe 18. Put another way, even though the distances between the edges 62 and the inner surface 48 of the tubular wall 46 on the inlet plate 60 are non-uniform about the inlet opening periphery, this distance is preferably greater than a wall thickness of the coupling pipe 18 to provide sufficient contact area on the plate portion 60 between the coupling pipe 18 and plate surface 60 to form a tight sealing engagement.

The housing 10 may be formed by an injection molding process. As a result, the housing 10 often includes an area of non-uniform mechanical properties, or weakening features, such as a knit or mold line 72. As shown in FIG. 4, the knit line 72 is located on the cylindrical wall 44 and generally extends the entire length of the housing 10, though it may extend only a portion thereof. As the knit line 72 is formed by two leading edges of molten plastic flows that are intended to have identical flow rates, the knit line 72 is generally straight though slightly irregular, which is exaggerated for illustrative purposes in the accompanying figures. The knit line 72 is positioned such that it generally bisects the side inlet 40 such that a weak point of the housing 10 is along the knit line 72 and proximate the side inlet 40. That is, though slightly irregular and not necessarily straight, the knit line 72 is generally parallel to the central longitudinal axis X and crosses the side inlet 40 upper and lower edges 66a and 66b and locations 80, 82, respectively. More specifically, the knit line 72 is generally aligned with the center of the side inlet 40.

During use, an internal pressure surge and fluctuation from activating or deactivating the water pressure generally causes stress at the side inlet. Generally, in prior housings with circular openings, an intersection of the knit line and the edge of the opening forming the circular configuration tends to be one of the weakest points along the housing upon the housing being pressurized with fluid. The configurations of the inlet opening 64 and relationship with the annular collar 46 of the housings herein minimize such stress concentrations.

Figure 5:
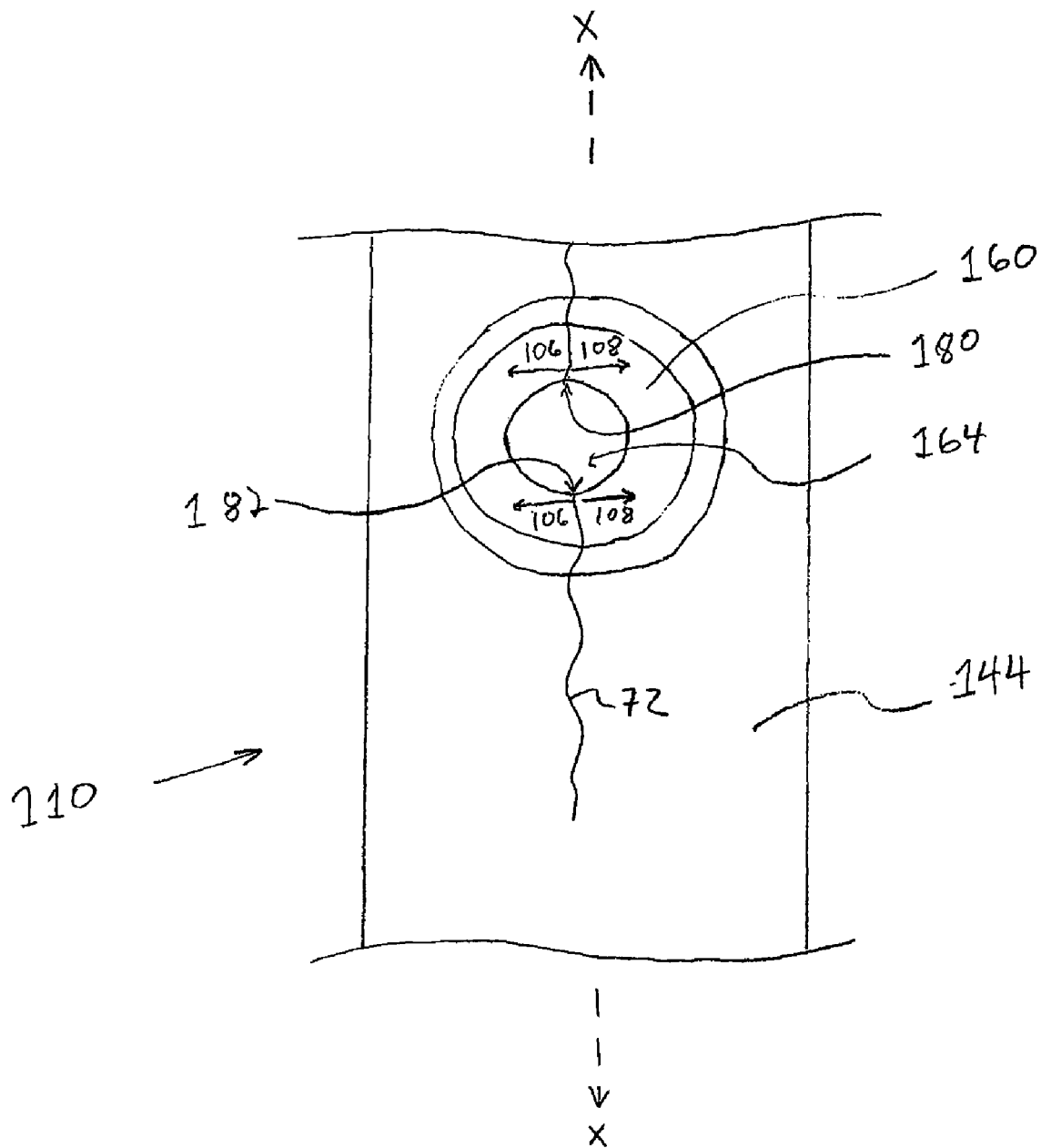
FIG. 5 is a portion of a side elevational view of a prior art sprinkler housing having a side inlet.

Traditionally, prior sprinkler housing designs with uniform or circular side inlet openings have included design features that actually act as stress concentrators to increase localized stress levels and shorten the effective lifespan of the sprinkler housing. More specifically, it has been determined that large stress concentrations exist in prior designs at upper and lower points 180 and 182, respectively, of traditional circular or uniform opening designs, as shown in the prior housing 110 of FIG. 5. The high stress concentrations at the upper and lower points 180, 182 of prior designs cause fatigue cracks to originate in these areas during cycling of the sprinkler. These cracks may propagate and produce leaks or fracture which may render the sprinkler inoperable.

The stress concentrations at upper and lower points 180, 182 of prior housing configurations are caused by the combination of the expansion of a cylindrical wall 144 and the expansion of the opening 164 during pressurization of the housing 110. The expansion of the cylindrical wall 144 places the material in tension, which pulls apart around the opening 164. Stated differently, the expansion of the cylindrical wall 144 creates a hoop stress within the cylindrical wall 144 that tends to pull apart the cylindrical wall 144 along a plane parallel to the longitudinal axis X. When the hoop stress acts on the cylindrical wall 144, the upper and lower points 180, 182 of prior housings each experience significant loading in opposite directions shown by arrows 106, 108. In such prior housings having circular inlet openings, the peak stress within the housing 110 is located at upper and lower points 180, 182 and may be up to four times the nominal wall stress within the housing 110 away from the opening 164.

In contrast, inlet plate portion 60 of the housings herein utilizes the edge shape 62 that defines inlet opening 64 with straight edges 66a, 66b extending parallel to the tensile forces caused by expansion of the housing 10, as shown in FIG. 4. These straight edges 66a, 66b position the stress concentrations away from the knit line 72 and toward the transitions 70 between the straight edges 66a, 66b and the curved edges 68a, 68b, which are circumferentially spaced from the knit line 72 as well as circumferentially spaced from the intersection 80, 82 of the minor axis 67 and the edge 62. Additionally, fillets 70 are positioned between the straight edges 66a, 66b and the curved edges 68a, 68b to minimize the stresses at those transitions. With respect to the edges 66a, 66b, they are generally flat and have no or negligible slope as they extend away from the respective upper or lower point 80, 82 about the center edges of the opening 64, which greatly reduces the maximum stress at the upper and lower points 80, 82. Conversely, if each edge 66a, 66b were modified to have a pair of sharp inclines away from its respective point 80, 82, i.e., V-shaped, the greater the stress concentration would be at each point 80, 82. Thus, peak stresses at the upper and lower points 80, 82 of the opening 64 may be reduced by utilizing the generally elliptical or oblong shape for the opening 64.

In one example, a Rain Bird® Model 1812 sprinkler housing having a 12" length with a standard circular side inlet opening was compared to a modified, non-uniform side inlet opening as described above using cycle-surge durability testing. In cycle-surge testing, the housing is pressurized to about 200 psi with about a 3 second on (pressurized) and about a 2 second off (non-pressurized) cycle rate. The cycle-surge testing is repeated until failure. In the table below, "Control" represents a standard, unmodified sprinkler housing having a circular opening in the side inlet. "Modified" represents a similar sprinkler housing but with a generally elliptical or oblong opening as described above. The test results are in Table 1 below and provide an average of cycles-to-failure when the sprinkler housing filled with water is subjected to about 200 psi approximately every 5 seconds.

TABLE 1

Average Number of Pressurization Cycles until Housing Failure

|  | Control-Circular Inlet | Modified Non-Uniform Inlet |
|---|---|---|
| Avg. Cycles to Failure | 2400 | 4900 |
| Change from Control (%) | — | +104% |

Additionally, finite element analysis was performed to measure the peak stress and the location of the peak stress within the housing for both the prior circular inlet shape and the modified, non-uniform inlet shapes of the housings herein. More specifically, a static structural finite element analysis was conducted on the Rain Bird® Model 1812 sprinkler housings described above. For the analysis, ABS material was used with a modulus of elasticity of about 350 ksi and a Poisson's ratio of about 0.35. Internal fluid pressure was modeled as being about 200 psi, and a vertical load of about 160 lbs was placed on the model. The vertical load was utilized to approximate the upwardly directed forces within the sprinkler housing due to pressurized fluid acting on the riser. "Control" represents a standard, unmodified sprinkler housing having a circular opening with no rib or other structure extending through the opening. "Modified" represents a sprinkler housing similar to the embodiment shown in FIG. 4, with a non-uniform, generally oblong side inlet opening and without any reinforcing rib or other structure bisecting the opening. The finite element analysis is provided in Table 2 below.

TABLE 2

Maximum Peak Stress in Sprinkler Housing during Pressurization

|  | Control-Circular Inlet | Modified-Non-Uniform Inlet |
|---|---|---|
| Peak Stress Within Housing (psi) | 5954 | 4072 |
| Change from Control (%) | — | −32% |

In the control housing, the peak stress was located at the top and bottom points of the inlet opening 180 and 182 (FIG. 5), which also tends to correspond to the intersection of the knit line 72 with the inlet opening 164. Therefore, the peak stress in the prior circular openings also occurred at one of the weaker points in the sprinkler body along the knit line 72. On the other hand, the peak stress in the modified or non-uniform inlet opening 64 was not only about 32 percent lower than the same sprinkler housing with an circular opening, but also shifted the peak stress location adjacent to the corner intersections or fillets 70 of the opening 64, which were circumferentially spaced from the knit line 72. Therefore, the housing 10 with the non-uniform opening 64 provides a more robust structure because the maximum peak stress is lower and occurs at a more durable portion of the housing wall 44 separate from the knit line 72.

Figure 6:
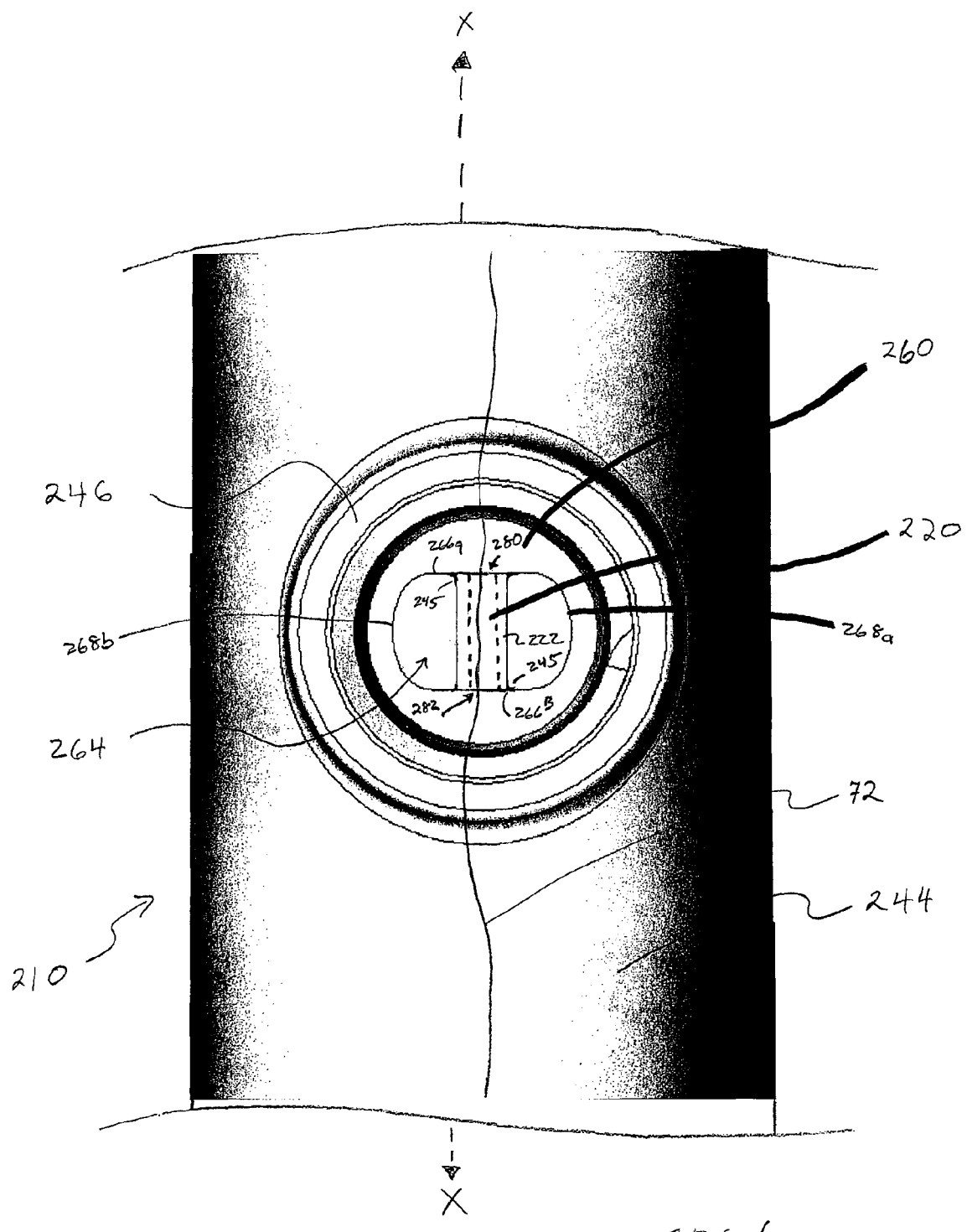
FIG. 6 is a portion of a side elevational view of another embodiment of a sprinkler housing having a side inlet.
Figure 7:
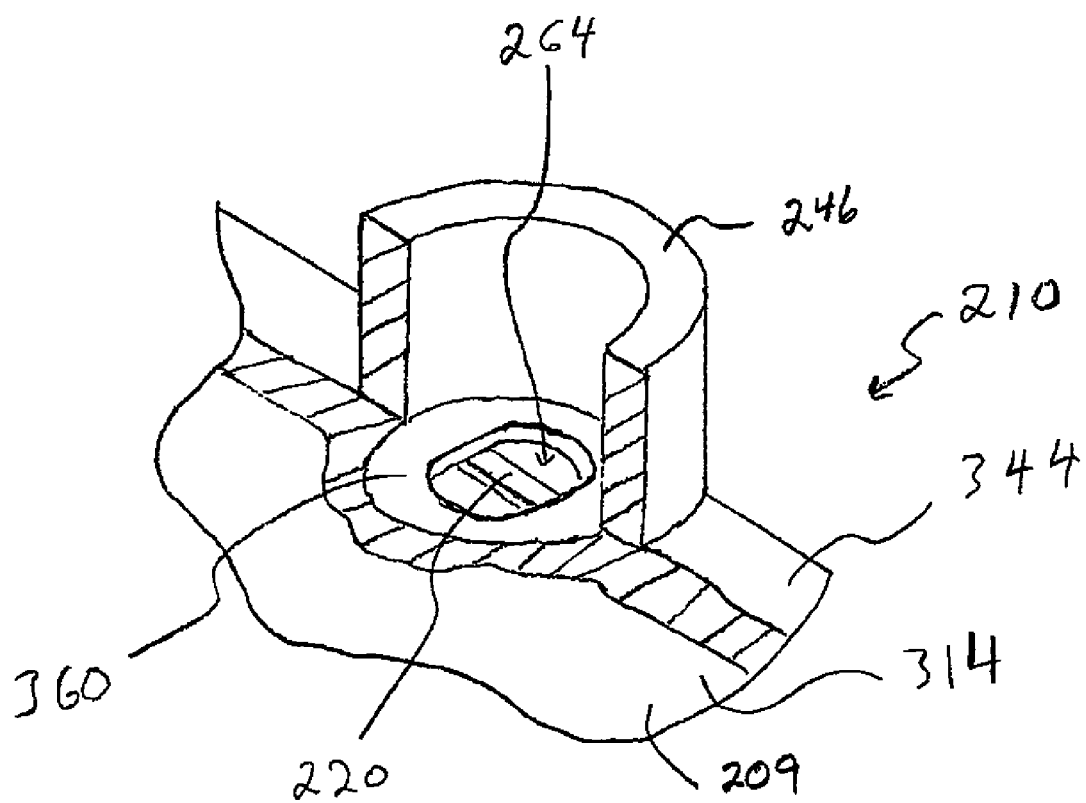
FIG. 7 is a cross-sectional view of the sprinkler housing of FIG. 6.

Turning now to FIGS. 6 and 7, another embodiment of a sprinkler housing 210 having a non-uniformly shaped side inlet 264 is provided. In this approach, housing 210 has a longitudinally oriented reinforcement structure 220 that extends the length of the housing 210 and bisects and spans the length of the opening 264. The reinforcement structure 220 may include a crosspiece 222 having an orientation parallel to the longitudinal axis X of the housing 210, the crosspiece extending across and bisecting the opening 264. Preferably, any crosspiece would be formed integrally with the reinforcement 220 and positioned radially outward therefrom within the opening 240 to add further reinforcement to the housing 210. Regardless of the presence of a crosspiece, the reinforcement structure 220 may be aligned with the knit line 72 to provide further reinforcement to the housing 210.

The reinforcement structure 220 may be in the form of one or more reinforcement members such as those described in U.S. Pat. No. 7,360,718, which is incorporated herein in its entirety. In one form, an internal surface 209 of the sprinkler housing 210 includes a plurality of the reinforcement members in the form of longitudinally oriented ribs 220 radially located at circumferentially spaced intervals. These ribs 220 cooperate with a riser ratchet of the sprinkler such that the riser 20 can freely move up and down within the sprinkler body 10, but may not rotate within and relative to the sprinkler body 210.

In this approach, the housing 210 has a generally elliptical or oblong opening 264 that includes the crosspiece member 222 spanning the opening 264 in an orientation generally parallel to the central longitudinal axis X of the sprinkler body 10. One of the reinforcement ribs 220 preferably comprises or joins with the crosspiece 222 to bisect and support the side inlet 264. In this configuration, the knit line 72 is generally aligned with the center of the side inlet 264 such that the crosspiece 222, rib 220, and knit line 72 are generally aligned with each other and with the longitudinal axis X. It should be noted that, when the crosspiece 222 is aligned with the knit line 72 in the region of the side inlet 264 and the reinforcement rib 220 is joined with or forms the crosspiece 222, the entire length of the reinforcement rib 220 may, accordingly, be aligned with the knit line 72, providing further reinforcement of the sprinkler body 10.

Again referring to FIGS. 6 and 7, the intersection of the rib 220 and crosspiece 222 and the inlet opening 262 is described in more detail. Similar to the previous embodiments, the opening 264 is elongated such that it is defined by a pair of generally parallel and straight edges 266a and 266b and a pair of curved edges 268a and 268b to form an oblong or obround shaped opening. The crosspiece 222 intersects with the side wall 244 centrally along the top and bottom straight edges 266a and 266b at intersection points 280 and 282, respectively. At each intersection portion, the crosspiece 222 and the sidewall 244 form at least one rounded corner 245 and, as depicted, form four corners 245.

Peak stress is also less in the sprinkler housing 210 with the rib 220 bisecting the opening 264 than in prior sprinkler housings having circular inlet openings and reinforcing ribs. A finite element analysis was performed on a sprinkler housing having a traditional uniform, circular opening with a bisecting rib and a modified sprinkler housing having a non-uniform, elongated side opening also with a bisecting rib. The non-uniform, elongated opening with a rib decreased peak stress about 26 percent over a similar housing with a circular, generally uniform side inlet opening. For the analysis, ABS material was used with a modulus of elasticity of about 350 ksi and a Poisson's ratio of about 0.35. Internal pressure was modeled as being about 200 psi, and a vertical load of about 160 lbs was placed on the model. Results are provided in Table 3 below. "Control" represents a standard, unmodified sprinkler housing having a circular opening with a rib bisecting the opening. "Modified" represents a sprinkler having a housing similar to the embodiment shown in FIGS. 6 and 7, with a non-uniform, generally oblong side inlet opening and a reinforcing rib bisecting the opening.

TABLE 3

Maximum Peak Stress in Sprinkler Housing during Pressurization

|  | Control-Circular Inlet | Modified-Non-Uniform Inlet |
|---|---|---|
| Peak Stress Within Housing (psi) | 6843 | 5078 |
| Change from Control (%) | — | −26% |

Figure 8:
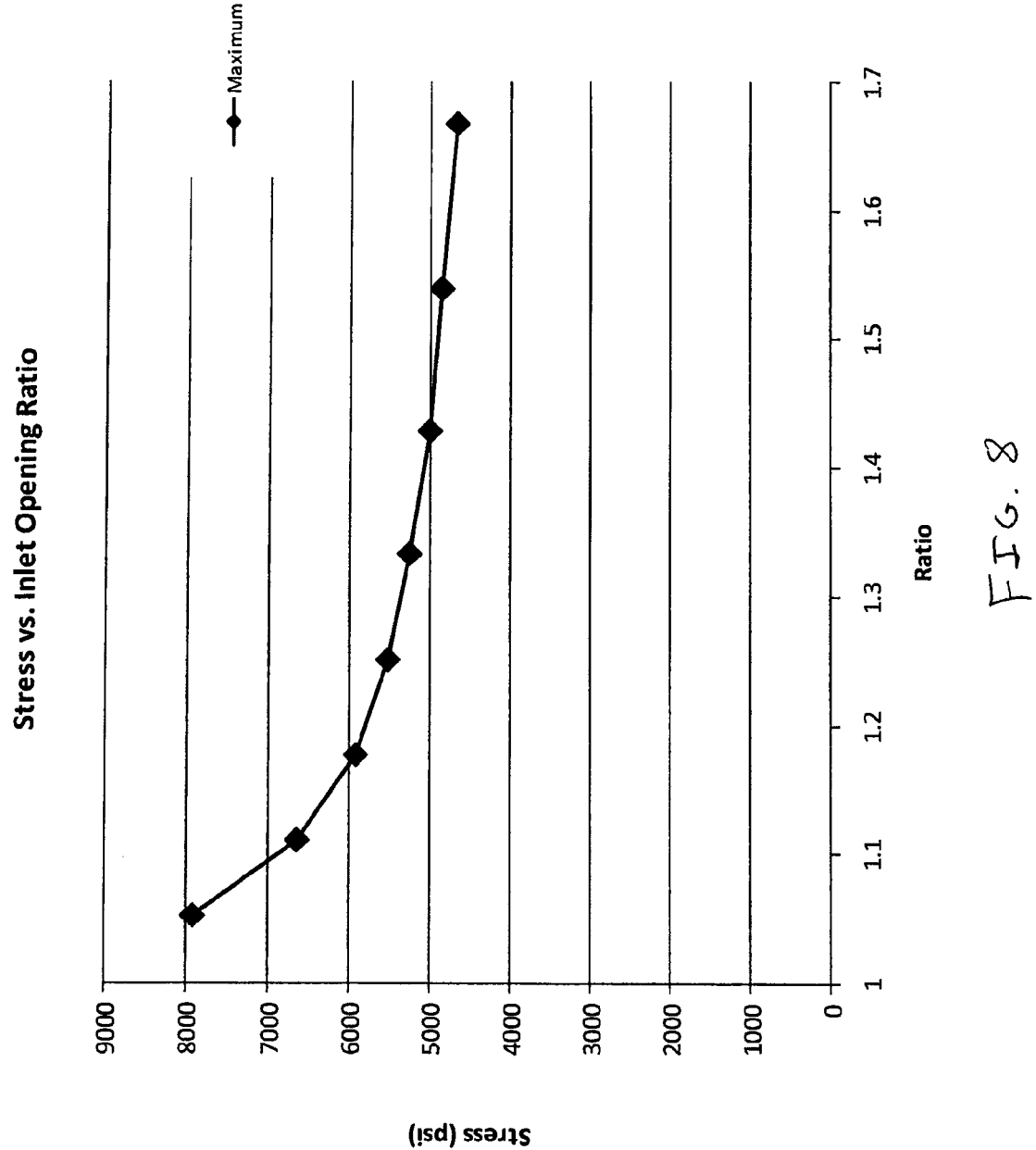
FIG. 8 is a chart showing stress versus inlet opening dimensions.

Turning now to FIG. 8, a Rain Bird® Model 1812 sprinkler housing having a reinforcing rib bisecting a non-uniform opening as described above was tested to determine the optimum minor axis length of the opening. The testing was performed using CosmosWorks® finite element analysis, using an ABS material having a modulus of elasticity of about 350 ksi and a Poisson's ratio of about 0.35. Further, the testing utilized a constant static pressure of about 200 psi within the sprinkler housing and a vertical load of about 160 lbs. While the major axis 65 length was held constant at about 0.5 inches, the length of the minor axis 67 was varied between about 0.3 and about 0.48 inches. That is, the ratio of the major axis 65 to the minor axis 67 varied from about 1.1 to about 1.7. FIG. 8 graphically illustrates the maximum peak stress within the sprinkler housing as a function of the ratio of major axis 65 length to minor axis 67 length.

As the ratio approaches 1, the opening becomes increasingly uniform and circular and the stress within the housing also increases. Conversely, as the ratio approaches 1.7, the opening becomes more elongated and oblong and the stress within the housing decreases, but the flow rate through the opening also decreases. FIG. 8 shows how, between a ratio of about 1.2 and about 1.7 where the opening is most elongated, the relationship between the ratio and maximum peak stress tends to be linear, whereas between 1.0 and 1.2, where the opening is approaching circular, the relationship tends to be non-linear and increases at a faster rate. A ratio between about 1.2 and about 1.7, and preferably approximately 1.5, balances the desired flow rate into the housing and the maximum peak stress observed on the housing wall. Such ratios are desired for both housings with and without the reinforcement member bisecting the inlet. Higher flow rate improves sprinkler performance and lower stresses within the housing to increase the fatigue life of the sprinkler housing so that the housing may be pressurized many more times before a crack occurs.

Another benefit of the sprinkler housings herein is that the peak stresses act upon a smaller surface area of the sprinkler housing wall than traditional sprinkler designs. To examine this improvement, the finite element analyses for the different sprinkler housings discussed in conjunction with Tables 2 and 3 were examined. Specifically, the approximate total surface area that experiences peak stress was compared from the finite element analysis results for each of the four different sprinkler housing designs of Tables 2 and 3. The results of this investigation are provided in Table 4 below. The "Circular Inlet Without Rib" represents a standard, unmodified sprinkler housing having a circular opening without a reinforcing rib bisecting the opening, whereas "Circular Inlet With Rib" represents a standard, unmodified sprinkler housing having a circular opening with a rib bisecting the opening. Similarly, the "Non-Uniform Inlet Without Rib" represents a sprinkler housing similar to the embodiment shown in FIG. 4, with a non-uniform, generally oblong side inlet opening and without any reinforcing rib or other structure bisecting the opening and the "Non-Uniform Inlet With Rib" represents a sprinkler housing similar to the embodiment shown in FIGS. 6 and 7 with a non-uniform, generally oblong side inlet opening with a rib bisecting the opening.

TABLE 4

Surface Area of Sprinkler Housing Subjected to Peak Stress

|  | Circular Inlet Without Rib | Non-Uniform Inlet Without Rib | Circular Inlet With Rib | Non-Uniform Inlet With Rib |
|---|---|---|---|---|
| Approximate Surface Area of Peak Stress (mm²) | ~35-41 | ~2-4 | ~46-56 | ~6-8 |
| Approximate Decrease from Circular Inlet (%) | — | −89% to −95% | — | −83% to −89% |

As is apparent from Table 4 above, the sprinkler housings herein provide a significant reduction in the area of the sprinkler housing side wall that experiences peak stress over prior housings, irrespective of the presence of a reinforcement rib. By subjecting a smaller surface area of the sprinkler housing to peak stresses, yielding within the sprinkler housing is more localized. Limiting the surface area of the sprinkler housing subjected to peak stresses also reduces the likelihood of catastrophic failure because cracks tend to be restricted to a smaller area instead of propagating along the sprinkler housing and causing sudden fracture thereof.

Figure 9:
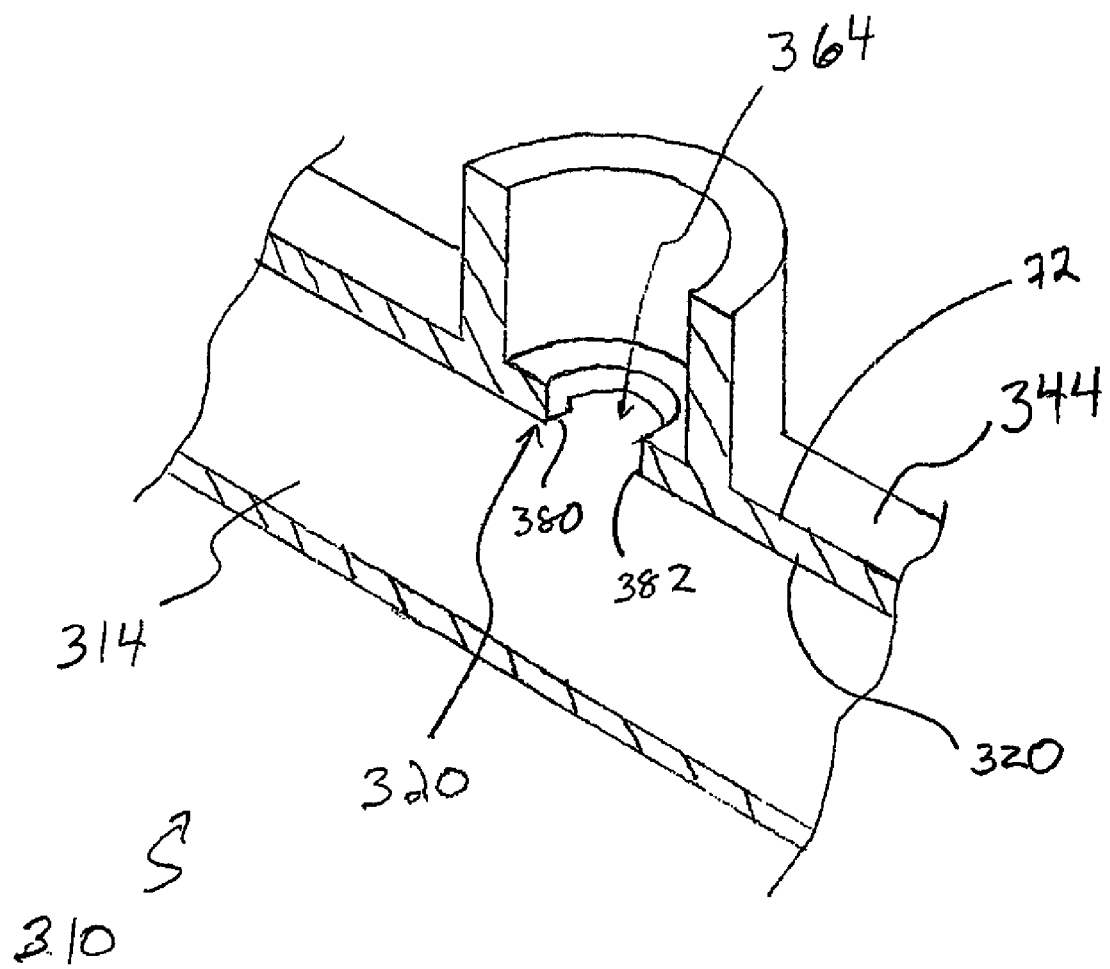
FIG. 9 is a cross-sectional view of another embodiment of the sprinkler housing.

Turning to FIG. 9, a different embodiment is shown where a housing 310 includes a reinforcement rib 320 similar to the previous approach that coincides with the knit line 72, but in this approach, the rib 320 ends on either side (382, 380) of an opening 364 so that the opening 364 is free of the rib 320 or other structure. Like the embodiment of FIGS. 6 and 7, the reinforcement rib 320 extends along an internal surface 314 of a cylindrical wall 344 with an orientation parallel to the length of the housing 310. This allows rib 320 to still cooperate with grooves formed in a riser ratchet and guide the riser assembly 12 during operation and at the same time still be positioned along the cylindrical wall 344 to overlie or coincide with the knit line 77 to provide reinforcement to the housing 310. By removing a section of the rib 320 that would normally extend across the opening 364, the opening 364 is unobstructed and allows maximum fluid flow through the opening 364 when the housing 310 is connected to a water source. A opening 363 free of obstructions decreases the fluid pressure drop across the opening 364 and improves sprinkler function.

Figure 10:
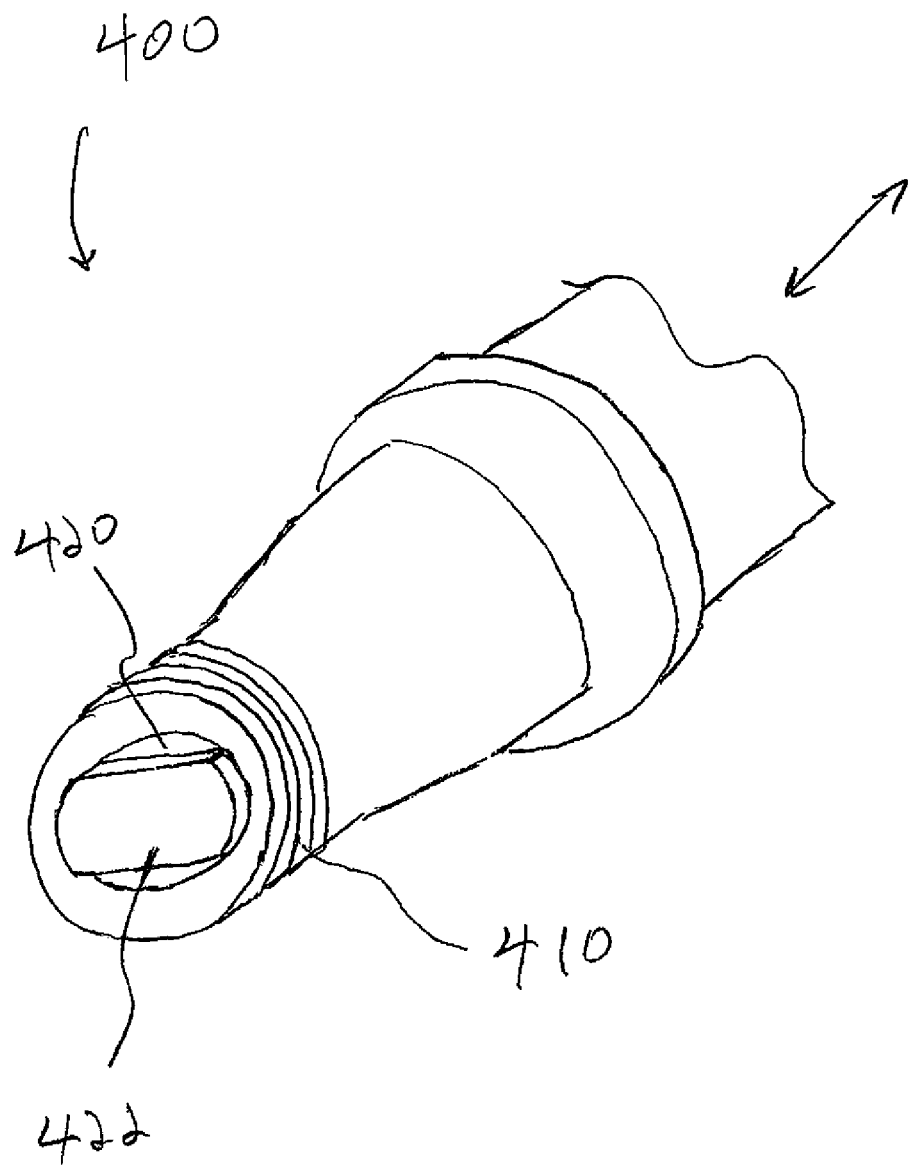
FIG. 10 is a perspective view of an exemplary tool for forming the side inlet openings of the sprinkler housings herein.

The prior uniformly shaped circular openings were quite easily formed during manufacturing by using a rotating threaded core that simply formed a circular opening. The non-circular, side openings described herein require a more complex manufacturing process employing a multi-part sleeve and core tooling assembly 400 as generally shown in FIG. 10. By one approach, the tooling includes an outer sleeve 410 that rotates to form the threading 50 on the inner surface 48 on the annular collar 46. The tooling also has an inner core 420 with protrusion 422 in the shape of the non-uniform side inlet opening 46, 246, or 346 that is withdrawn after the molding process. For instance, during the injection molding process, the side inlet openings described herein are preferably formed using the stationary core 420 that is mounted on the rotating thread sleeve 410 used to cut threads into an inner surface 48 of the tubular wall 46. As the rotating thread sleeve 410 is drawn through the inner surface 48, the stationary core 420 pulls straight out from the inlet plate 60 to form the openings 64, 264, and 364. The core 420 can be modified to form openings with the reinforcement rib.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An injection molded plastic sprinkler housing for a pop-up sprinkler, the housing comprising:
   an injection molded plastic cylindrical side wall defining an internal cavity and a longitudinal axis extending between opposite ends thereof;
   an inlet opening defined by the injection molded plastic sidewall to provide access to the internal cavity;
   an annular collar extending from the side wall of the housing about the inlet opening and configured to receive an irrigation supply line;
   a peripheral edge of the inlet opening having a non-uniform shape relative to a centrally located point in the inlet opening so that a major axis thereof oriented through the central point substantially transverse to the longitudinal axis is longer than a shorter minor axis thereof oriented through the central point along the longitudinal axis of the housing, a ratio of a length of the major axis to a length of the minor axis is between about 1.2 and about 1.7; and
   the non-uniform shape of the inlet opening configured to position regions of peak stress concentration on the injection molded plastic cylindrical side wall, upon the sprinkler housing being filled with a pressurized fluid, circumferentially spaced from an intersection of the minor axis and the peripheral edge of the inlet opening.

2. The sprinkler of claim 1, wherein the peripheral edge of the inlet opening has two straight edges extending about the major axis and two arcuate edges extending about the minor axis such that the inlet opening has a generally elongated shape.

3. The sprinkler of claim 2, wherein the peripheral edge has a curved intersection between each straight edge and arcuate edge to reduce stress concentrations therebetween.

4. The sprinkler of claim 1, wherein the ratio is about 1.5.

5. The sprinkler of claim 1, wherein the inlet opening is centrally positioned on the sidewall within the annular collar so that a distance on the sidewall between the peripheral edge and the annular collar along the minor axis is greater than a distance on the sidewall between the peripheral edge and the annular collar along the major axis and wherein the distance between the peripheral edge and the annular collar along the major axis is greater than a thickness of a coupling received in the annular collar to provide a fluid tight engagement therewith.

6. The sprinkler of claim 1, wherein the cylindrical side wall includes a molding knit line bisecting the inlet opening, and the regions of peak stress concentration on the cylindrical side wall, upon the sprinkler housing being filled with a pressurized fluid, are circumferentially spaced from the molding knit line and a surface area of the regions of peak stress concentration are about 8 mm$^2$ or less.

7. The sprinkler of claim 6, wherein the cylindrical side wall includes a reinforcing rib coinciding with the molding knit line.

8. A fluid conduit for an irrigation system, the fluid conduit comprising:
   an elongate injection-molded sprinkler housing having a side wall, an inner edge defining an inlet opening in the side wall, and a longitudinal axis extending between opposite ends thereof;
   a molding knit line extending in a longitudinal direction along at least a portion of a length of the sprinkler housing side wall and bisecting the inlet opening;
   at least one region of peak stress concentration in the side wall extending from the inner edge of the inlet opening upon the sprinkler housing being filled with a pressurized fluid;
   an elongated shape of the inlet opening configured to position the at least one region of peak stress concentration circumferentially spaced from the molding knit line to reduce the stress concentrations in the side wall adjacent an intersection of the molding knit line and the inlet opening upon the sprinkler housing being filled with a pressurized fluid;
   a major axis of the inlet opening extending generally transverse to the longitudinal axis and a shorter minor axis of the inlet opening extending along the longitudinal axis so that the inlet opening has a generally obround shape where a ratio of a length of the major axis to a length of the minor axis is between about 1.2 and about 1.7;
   a surface area of the sprinkler housing experiencing the peak stress concentration being about 8 mm$^2$ or less upon the sprinkler housing pressurized with about 200 psi of fluid; and
   the inlet opening is centrally positioned on the side wall within an annular collar so that a distance on the side wall between the inner edge of the inlet opening and the annular collar along the minor axis is greater than a distance on the side wall between the inner edge and the annular collar along the major axis so that the distance between the inner edge and the annular collar along the major axis is greater than a thickness of a coupling received in the annular collar to provide a fluid tight engagement therewith.

9. The fluid conduit of claim 8, wherein the elongated shape of the inlet opening has two spaced substantially parallel straight edges extending transverse to the longitudinal axis.

10. The fluid conduit of claim 8, wherein the ratio is about 1.5.

11. The fluid conduit of claim 8, wherein the sprinkler housing has a reinforcement rib formed on an interior surface of the housing side wall, the reinforcement rib being generally aligned with the molding knit line and extending across the inlet opening.

12. The fluid conduit of claim 8, wherein the sprinkler housing has a reinforcement rib formed on an interior surface of the housing side wall, the reinforcement rib being generally aligned with the molding knit line and stops at the edge of the inlet opening so that the reinforcement rib does not extend across the inlet opening.

13. A pop-up sprinkler comprising:
- a sprinkler housing having a side wall defining a cavity therein, an inlet opening defined on the side wall for receipt of an irrigation fluid, an upper end of the sidewall, and a longitudinal axis extending from the upper end to an opposite lower end;
- a pop-up riser assembly having at least one nozzle thereon for projecting the irrigation fluid outwardly from the sprinkler to irrigate a ground surface area, the pop-up riser assembly configured to slide along the longitudinal axis;
- an annular collar extending outwardly from the side wall about the inlet opening, the annular collar configured to receive a fluid inlet conduit;
- a plate portion of the housing side wall within the annular collar, the plate portion having an inner edge thereof defining a shape of the inlet opening;
- a distance on the plate portion along the longitudinal axis between the inner edge of the plate portion and the annular collar being longer than a distance on the plate portion transverse to the longitudinal axis between the inner edge and the annular collar so that the inlet opening has a generally elongated shape; and
- a major axis and a minor axis of the inlet opening with a ratio of a length of the major axis to a length of the minor axis being between about 1.2 and about 1.7 with the distance on the plate portion transverse to the longitudinal axis longer than a thickness of a coupling received in the annular collar to provide a fluid tight engagement therewith.

14. The pop-up sprinkler of claim 13, wherein the plate portion defines the shape of the inlet opening as generally oblong so that the distance between the inner edge and the annular collar is at a maximum at two opposed points along the minor axis and a minimum at two opposed points extending along a line transverse to the minior axis.

15. The pop-up sprinkler of claim 13, wherein the inner edge of the plate portion includes two spaced straight edges and two spaced curved edges where the straight edges are tangent to the ends of the curved edges to define the shape of the inlet opening.

16. The pop-up sprinkler of claim 13, wherein the ratio is about 1.5.

\* \* \* \* \*

UNITED STATES PATENT AND TRADEMARK OFFICE
CERTIFICATE OF CORRECTION

| | |
|---|---|
| PATENT NO. | : 8,167,221 B2 |
| APPLICATION NO. | : 12/470273 |
| DATED | : May 1, 2012 |
| INVENTOR(S) | : Michael A. McAfee and Noel Perez |

It is certified that error appears in the above-identified patent and that said Letters Patent is hereby corrected as shown below:

IN THE CLAIMS:

Column 14, in Claim 14, line 19, delete "minior" and insert --minor-- therefor.

Signed and Sealed this
Second Day of October, 2012

David J. Kappos
*Director of the United States Patent and Trademark Office*